(12) United States Patent
Beatty et al.

(10) Patent No.: US 7,104,391 B2
(45) Date of Patent: Sep. 12, 2006

(54) VERTICAL CONVEYOR

(75) Inventors: Cam Beatty, Mississauga (CA); John Pound, Mississauga (CA)

(73) Assignee: Cardinal Meat Specialists Limited, Mississauga (CA)

( * ) Notice: Subject to any disclaimer, the term of this patent is extended or adjusted under 35 U.S.C. 154(b) by 0 days.

(21) Appl. No.: 10/758,194

(22) Filed: Jan. 16, 2004

(65) Prior Publication Data

US 2005/0155844 A1    Jul. 21, 2005

(51) Int. Cl.
    *B65G 15/14* (2006.01)
(52) U.S. Cl. .................................................. 198/626.1
(58) Field of Classification Search ............. 198/626.1, 198/626.2, 626.3, 626.4, 626.6
    See application file for complete search history.

(56) References Cited

U.S. PATENT DOCUMENTS

| | | | | |
|---|---|---|---|---|
| 3,690,444 A | * | 9/1972 | Chassang ................. | 198/626.6 |
| 3,939,965 A | * | 2/1976 | Blattermann et al. ..... | 198/688.1 |
| 4,393,758 A | * | 7/1983 | Anmahian ................. | 99/450.6 |
| 4,457,422 A | * | 7/1984 | Hurd ........................ | 198/626.6 |
| 4,729,755 A | * | 3/1988 | Misener et al. ........... | 198/620 |
| 4,951,806 A | * | 8/1990 | Schwing et al. .......... | 198/626.3 |
| 6,557,696 B1 | * | 5/2003 | Frich ........................ | 198/626.4 |

FOREIGN PATENT DOCUMENTS

| | | | |
|---|---|---|---|
| DE | 8806129 | | 6/1988 |
| GB | 2184415 A | * | 6/1987 |
| JP | 61166405 | | 7/1986 |

* cited by examiner

*Primary Examiner*—Gene O. Crawford
*Assistant Examiner*—Mark A. Deuble
(74) *Attorney, Agent, or Firm*—Cahn & Samuels, LLP

(57) ABSTRACT

A conveyor system having an inlet, an outlet, and a first endless conveying element having a contact surface and configured to transport at least one object along a transportation path from proximate the inlet to proximate the outlet. Securing means are also provided for securing the at least one object to the contact surface along a secured portion of the transportation path.

15 Claims, 5 Drawing Sheets

VERTICAL CONVEYOR

FIELD OF THE INVENTION

The present invention relates generally to the field of packing systems, with common but by no means exclusive application to conveyors used in the food industry.

BACKGROUND OF THE INVENTION

For the food industry, as for other industries, plant floor space is at a premium.

Certain types of forming and processing machines discharge their product at well above head-height (often 3 metres or more) above the floor level of the plant. The product typically must be lowered from this height to about waist-height (approximately 1 metre) above floor level for packing into boxes or other shipping containers.

Accordingly, the inventors have recognized a need for an effective conveyor system.

SUMMARY OF THE INVENTION

This invention is directed toward a conveyor system.

Specifically, the subject invention is directed towards a conveyor system comprising an inlet, an outlet, a first endless conveying element having a contact surface and configured to transport at least one object along a transportation path from proximate the inlet to proximate the outlet and securing means for securing the at least one object to the contact surface along a secured portion of the transportation path.

The invention is further directed towards a conveyor system comprising an inlet, an outlet, a first endless conveying element having a first contact surface and configured to transport at least one object along a transportation path from proximate the inlet to proximate the outlet, and a second endless conveying element having a securing surface positioned adjacent the contact surface along a secured portion of the transportation path so that the at least one object is secured between the first and second conveying elements, along the secured portion of the transportation path.

Preferably, the conveyor system includes at least one main guide element for directing the first and second endless conveying elements along said secured portion of the transportation path. The main guide element typically includes a plurality of main guide rollers.

BRIEF DESCRIPTION OF THE DRAWINGS

The present invention will now be described, by way of example only, with reference to the following drawings, in which like reference numerals refer to like parts and in which.

DESCRIPTION OF THE PREFERRED EMBODIMENTS

Figure 1:
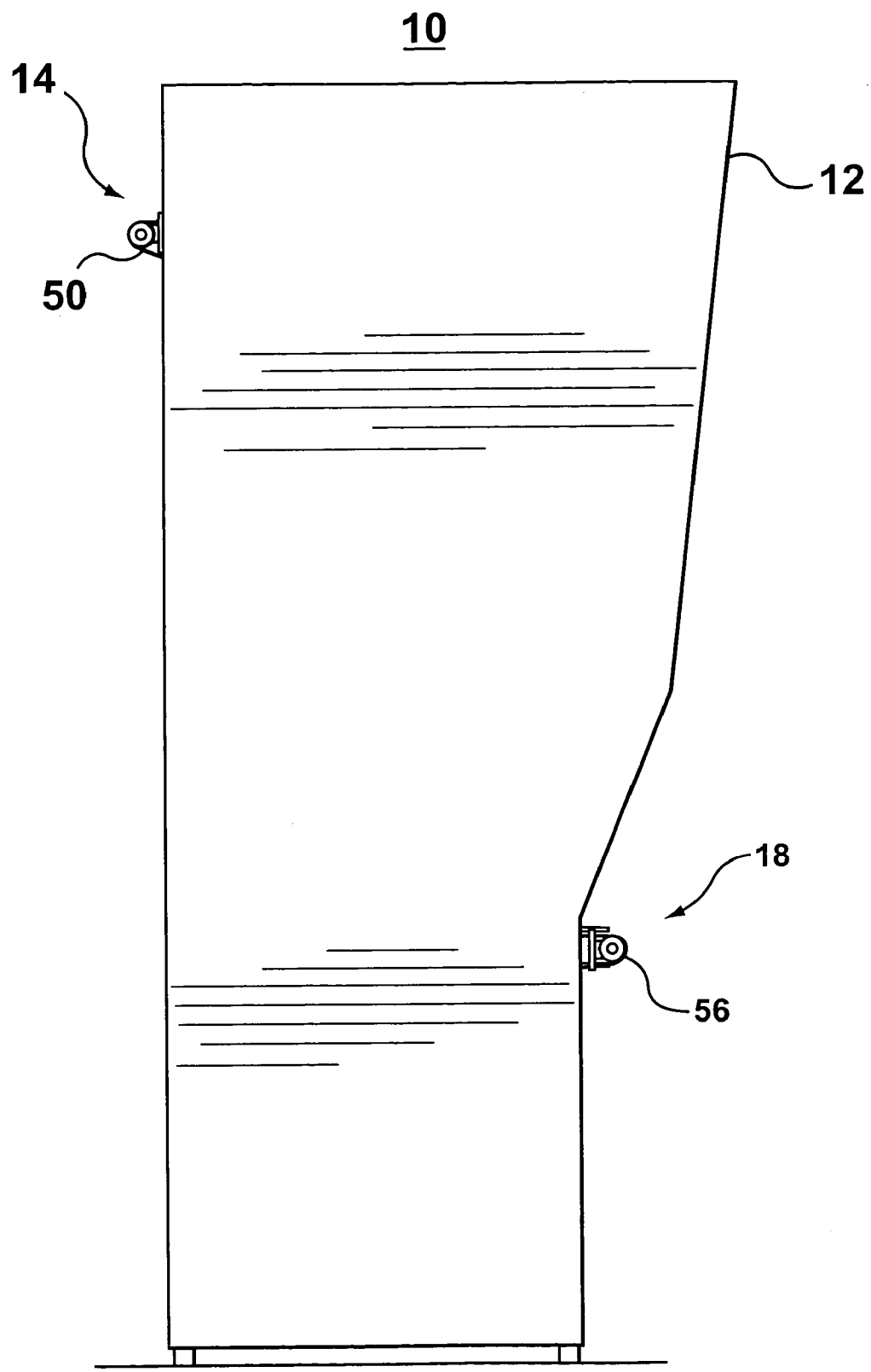
FIG. 1 is a side view of a conveyor system made in accordance with the present invention.

Referring simultaneously to FIGS. 1, 2, 3 & 4, illustrated therein is a preferred embodiment of the conveyor system of the subject invention. The conveyor system, shown generally as 10, comprises a housing 12, a structural framework 13, an inlet 14 for receiving objects 16 such as frozen hamburger patties, and an outlet 18 for discharging the objects 16 from the system 10.

Figure 2:
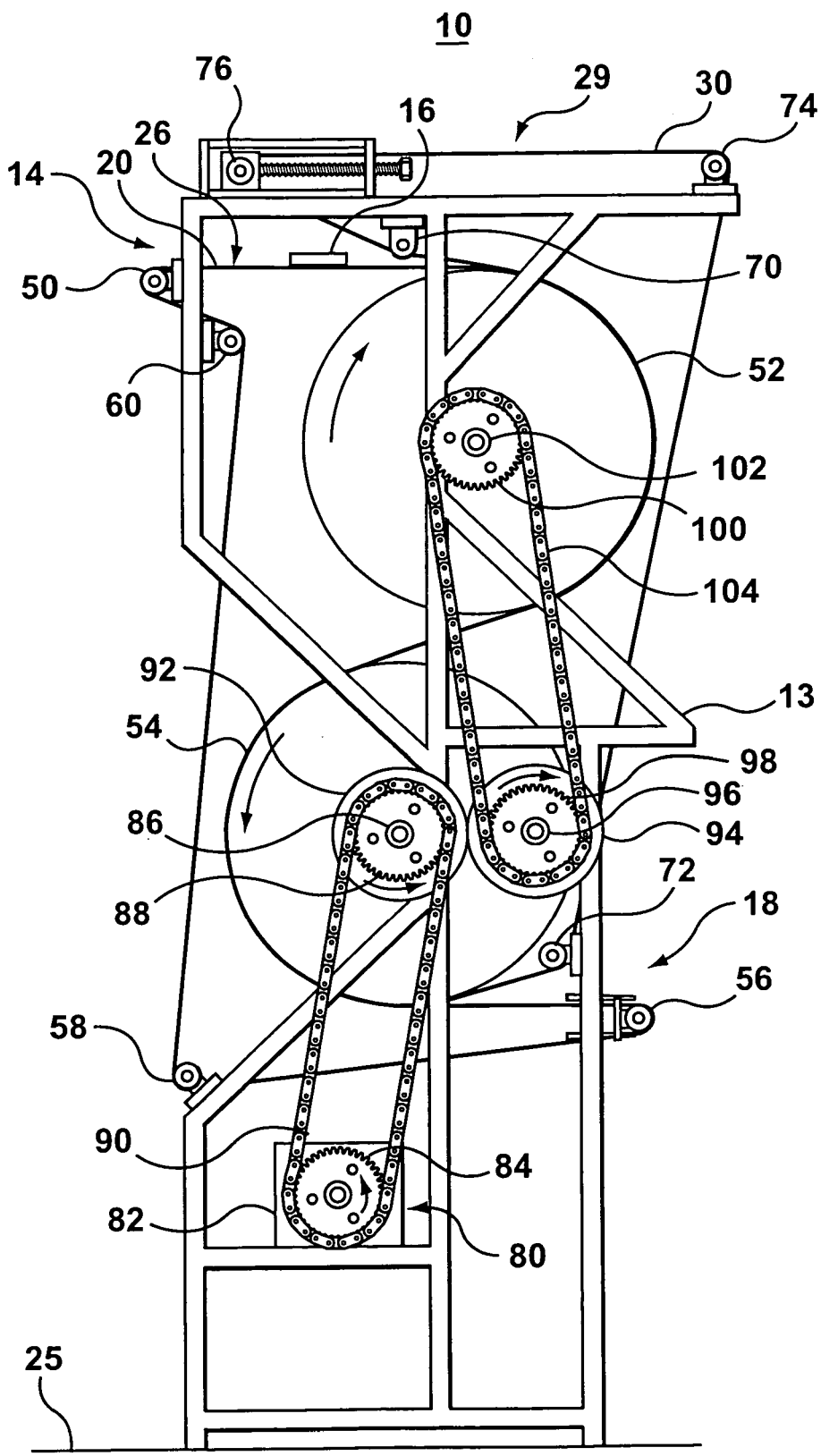
FIG. 2 is a side view of the conveyor system of FIG. 1 with the housing removed.
Figure 3:
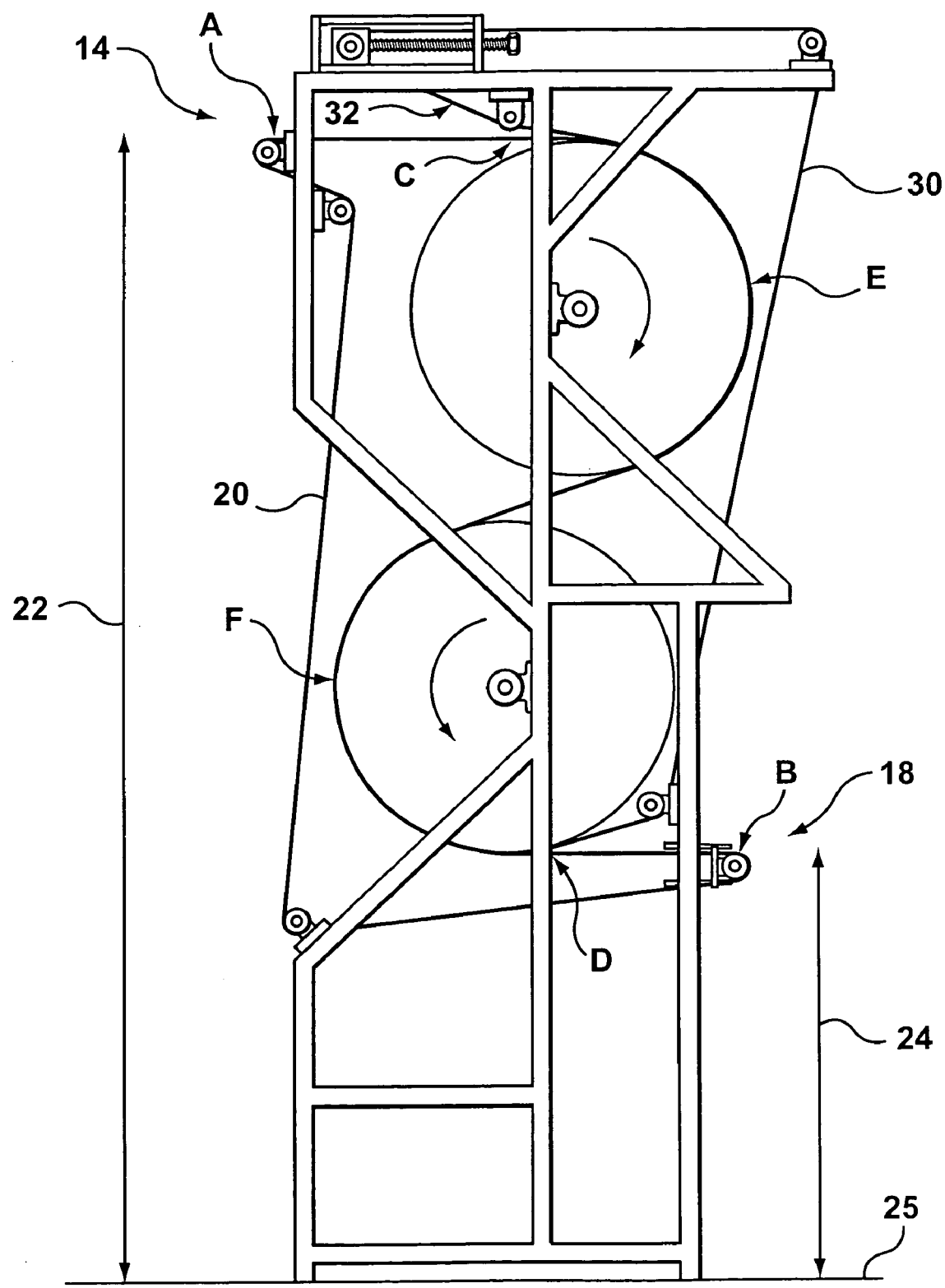
FIG. 3 is a side view of the conveyor system of FIG. 1 with the housing and drive mechanism removed.
Figure 4:
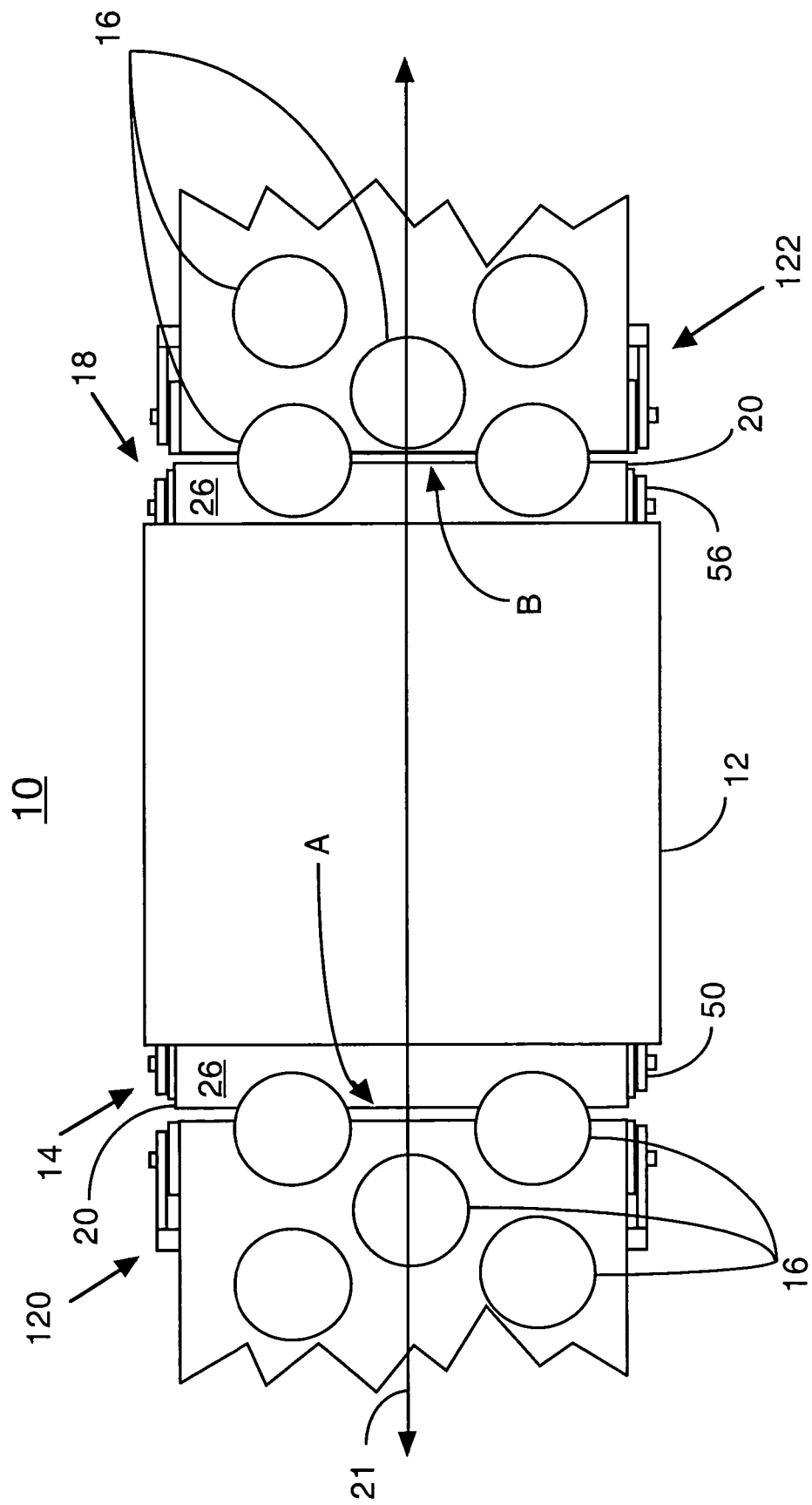
FIG. 4 is a top schematic view of the conveyor system of FIG. 1.

As can be seen in FIG. 4, typically the inlet 14 and the outlet 18 are in substantial alignment with each other. The inlet 14 and the outlet 18 are substantially aligned with a vertical plane extending through line 21 and at 90° to the substrate on which FIG. 4 is displayed. However, as shown in FIGS. 1–3, the inlet 14 and the outlet 18 are positioned proximate different vertical heights, a first height 22 and a second height 24 above the plant floor 25.

The conveyor system 10 also includes a first endless conveying element 20. Typically, the conveying element 20 is in the form of a belt, although other material such as webbing or a series of cables may also be used. The system 10 also includes securing means, shown generally as 29, for securing the objects 16 to the first endless conveying element 20. The securing means will typically take the form of a second endless conveying element 30, often in the form of a belt, although other material such as webbing or a series of cables may also be used.

The conveyor system 10 also includes a plurality of guide rollers to guide the conveying elements 20, 30 over their respective circuits. First conveying element 20 travels in sequence over guide roller 50, then in serpentine manner clockwise over first main guide element in the form of a first main guide roller 52 and counterclockwise over a second main guide element in the form of a second main guide roller 54, before passing over guide rollers 56, 58 and 60 and back to guide roller 50. Guide roller 56 is provided with a biasing mechanism such that the guide roller 56 functions as a conveyor tensioner in known manner to maintain the tension of the conveying element 20.

The second conveying element 30 travels in sequence over pinch roller 70, and then in serpentine manner clockwise over main guide roller 52 and counterclockwise over main guide roller 54, before passing over guide rollers 72, 74, 76 and back to pinch roller 70. Guide roller 76 is provided with a biasing mechanism such that the tension guide roller 76 functions in known manner as a conveyor tensioner to maintain the tension of the conveying element 30.

The first conveying element 20 has a contact surface 26 on which the objects 16 are transported along the transportation path A–B which commences at about position A (which extends laterally across substantially the width of the first conveying element 20) proximate the inlet 14 and follows the direction of travel of the first endless conveying element 20 and ends about position B (which extends laterally across substantially the width of the first conveying element 20) proximate the outlet 18. As will be understood, proximate the inlet 14, the contact surface 26 is typically the upper surface of the first conveying element 20.

The second conveying element 30 has a securing surface 32 which secures the objects 16 to the contact surface 26 while the objects 16 are transported along a substantially curvilinear secured portion C–D of the transportation path A–B commencing from about position C (which extends laterally across substantially the width of the first conveying element 20) proximate the pinch roller 70 and following the direction of travel of the first endless conveying element 20 to about position D (which extends laterally across substantially the width of the first conveying element 20) proximate the bottom of the second main guide roller 54.

As will also be understood, commencing about position C, the second conveying element 30 (and accordingly the securing surface 32) is guided into close and typically overlapping proximity with the first conveying element 20 (and correspondingly the contact surface 26) by pinch roller 70 such that objects 16 are positioned or sandwiched between the securing surface 32 and the contact surface 26. The proximity between the securing surface 32 and the contact surface 26 is maintained over the secured portion C–D of the transportation path A–B.

As should also be apparent, the tension of the conveying elements 20, 30 and their proximity to each other over the secured portion C–D of the transportation path A–B should be configured to secure and maintain the position of the objects 16 on the first conveying element 20.

The system 10 is also provided with a drive mechanism, shown generally as 80, for driving the first and second conveying elements 20, 30 at approximately the same speed. In the example illustrated, the drive mechanism 80 includes a variable speed electric motor unit 82 configured for driving a sprocket gear 84. The electric motor unit 82 is mounted to the structural framework 13. The second main guide roller 54 is fixed to an axle 86, to which is also fixed a sprocket gear 88, typically by welding the gear 88 to the axle 86. A first drive chain 90 connects the sprocket gears 84, 88, and transfers rotational power from sprocket gear 84 to drive the main guide roller 54.

A spur gear 92 is also fixed to the axle 86 of the main guide roller 54. A cooperative spur gear 94 is mounted to an idler shaft axle 96, and the axle 96 and spur gear 94 are positioned such that the spur gear 92 engages the spur gear 94. As a result, the spur gear 92 is able to drive the spur gear 94. A sprocket gear 98 is also fixed to the idler shaft axle 96. A third sprocket gear 100 is fixed to the axle 102 of the first main guide roller 52. A second drive chain 104 connects the sprocket gears 98, 100, and transfers rotational power from sprocket gear 98 to drive the first main guide roller 52.

As will be understood, each of the axles 86, 96, 102 is rotatably mounted to the structural framework 13.

For ease of configuration, preferably sprocket gears 84, 88, 98 and 100 are of substantially identical configuration (including having the same number of teeth). Spur gears 92 and 94 are also preferably of identical configuration (including having the same number of teeth). The main guide rollers 52, 54 are also preferably of approximately the same size. With the configuration of the various components as described above, the drive mechanism 80 is able to drive the main guide rollers 52, 54 at approximately the same speed and in opposite directions. Correspondingly, the first and second conveying elements 20, 30 are also driven at approximately the same speed.

Preferably, the conveying elements 20, 30 are selected to be somewhat elastic, to accommodate the shape of the objects 16 which are being transported over the secured portion C–D of the transportation path A–B. In situations in which the conveyor system 10 is to be used to convey food products, as will be understood the conveying elements 20, 30 should be selected to be safe for use with food and also sterilizable.

As should also be apparent, at around points E and F of the secured portion of the transportation path A–B, such portion is substantially vertical. As a result, the tension of the conveying elements 20, 30 and the securing force of the securing surface 32 relative to the contact surface 26 should be sufficient to hold the objects 16 in position on the contact surface 26 particularly at such vertical portions E, F.

As will also be understood, the size of the main guide rollers 52, 54 should be selected to be sufficiently large relative to the size of the objects 16 (and particularly in the case of objects 16 with limited structural strength, such that the bending force applied to the objects 16 as they are transported around the circumference of the main guide rollers 52, 54 is low enough to avoid breaking or otherwise damaging the objects 16. In the design depicted in FIGS. 1 and 2, the diameter of the main guide rollers 52, 54 is substantially one half of the difference between the height 22 proximate the inlet 14 and the height 24 proximate the outlet 18.

However, different sizes and configurations of the main guide rollers 52, 54 may be used. For example, while the conveyor system 10 has been illustrated and described as having two main guide rollers 52, 54, it should be understood that only one, or three or more main guide rollers may be used. If a plurality of guide rollers are used with the conveying elements 20, 30 travelling in serpentine fashion around them, it will typically be expected that the direction of travel of objects 16 entering the inlet 14 and the direction of travel of objects 16 leaving the outlet 18 will be substantially the same (but with the inlet 14 and outlet 18 on opposite sides of the conveyor system 10) if an even number of main guide rollers is used (ie. from left to right in FIG. 4), and substantially opposite if an odd number of main guide rollers is used (but with the inlet 14 and outlet 18 on the same side of the conveyor system 10). Similarly, if only a single main guide roller is used, it will typically be expected that the direction of travel of objects 16 entering the inlet 14 and the direction of travel of objects 16 leaving the outlet 18 will be substantially opposite (but with the inlet 14 and outlet 18 on the same side of the conveyor system 10).

Referring more specifically to FIG. 4 (which has been schematically adjusted to show the outlet 18 which would not otherwise be visible from a top view of the configuration shown in FIGS. 1–3), feeding 120 and receiving 122 endless conveyors may also be provided for loading and unloading objects 16 to and from the system 10, respectively. Objects 16 which enter the inlet 14 in a registered (or organized) manner, also exit the outlet 18 in a registered manner, which facilitates the packing of the objects 16 after exiting the conveyor system 10.

As well, while the embodiment of the present invention has been illustrated and described herein as utilizing large main guide rollers 52, 54, alternatively, it should be understood that the main guide elements might include a series of opposing and flexibly biased pinching rollers to define and guide the conveying elements 20, 30 along a transportation path, while at the same time providing sufficient securing force to secure the objects 16 to the contact surface 26 of the first conveying element 20.

Alternatively, provided that bearings, rollers or other means are used to minimize friction, a fixed curvilinear surface could be substituted in place of one or each main guide roller 52, 54, for guiding and maintaining sufficient tension and securing force of the conveyor elements 20, 30. With such a configuration, as will be understood, the drive mechanism 80 would require alteration to enable it to drive the conveyor elements 20, 30 at approximately the same speed.

Figure 5:
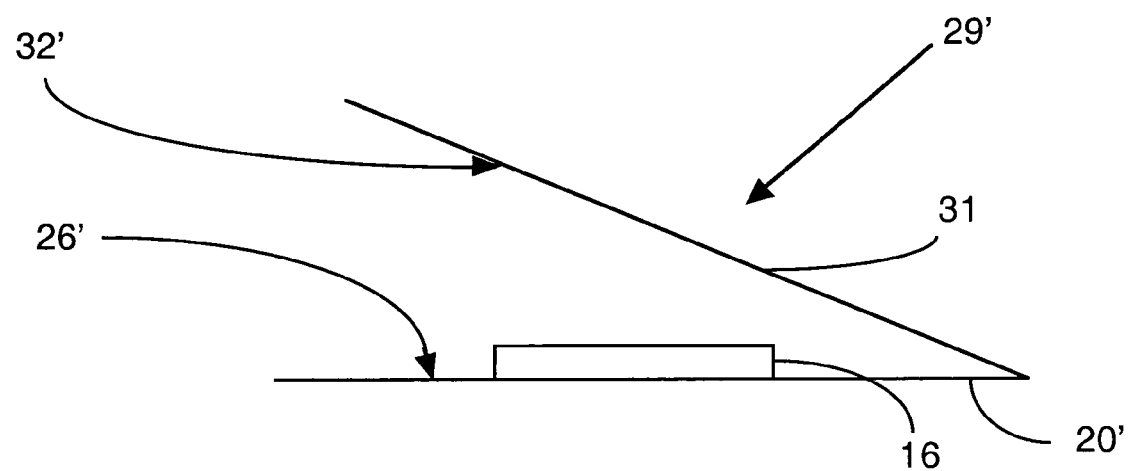
FIG. 5 is an end cross-sectional view of a portion of an endless conveying element of an alternate configuration.

Referring now to FIG. 5, illustrated therein is an end cross-sectional view of an alternate configuration of a first endless conveying element shown generally as 20'. The endless conveying element 20' includes a contact surface 26' on which objects 16 may be positioned. The conveying element 20' also includes a securing means 29' which includes a securing portion 31 of the endless conveying element 20'. The portion 31 includes a securing surface 32'. The portion 31 (and corresponds to the securing surface 32') may be moved or folded over into overlapping proximity to contact surface 26' such that objects 16 are positioned or sandwiched between the securing surface 32' and the contact surface 26'. Such an alternate embodiment avoids the need for the use of a second endless conveying element 30 illustrated in FIGS. 2 and 3, but the remaining elements of the system 10 remain substantially unchanged.

Thus, while what is shown and described herein constitute preferred embodiments of the subject invention, it should be understood that various changes can be made without departing from the subject invention, the scope of which is defined in the appended claims.

We claim:

1. A conveyor system for moving solid objects from a first height to a second height, comprising:
   (a) an inlet at a first select position and disposed at said first height;
   (b) an outlet at a second select position which is different from the first select position and disposed at said second height;
   (c) a generally curvilinear transportation path disposed between said first select position and said second select position and in conveying communication from proximate the inlet to proximate the outlet where said curvilinear path is defined by a first generally laterally disposed segment, a second arcuate segment including a vertical component extending between said first and second heights, and a third generally laterally disposed segment substantially parallel to and spaced from said first segment;
   (d) a first endless conveying element to transport said solid objects having a contact surface defining a portion of said curvilinear transportation path;
   (e) a main cylindrical guide element having a diameter generally corresponding to a simple fraction of the difference between the first and second heights including a generally arcuate perimetric surface dimensioned for minimizing bending force delineating said second arcuate segment of said curvilinear transportation path; and
   (f) a second endless conveying element that positions and retains at least one of said objects on the contact surface along said second arcuate segment of said the curvilinear transportation path;
   where said first and second conveying elements overlap along said second segment and are driven by said cylindrical guide element and where said at least one object is inverted as a result of travel between said first and third segments.

2. The conveyor system of claim 1, wherein said second segment of the transportation path has a vertically directed component corresponding to the diameter of said cylindrical guide element and 1/x of the a difference between the first and second heights where x=1, 2 or 3.

3. The conveyor system of claim 1, where said inlet and said outlet are separated by a select vertical distance, said inlet facing a first direction end said outlet facing a second, opposite direction, and where said curvilinear transportation path is serpentine, said conveyor system further comprising a second main cylindrical guide element for directing the first and second endless conveying elements along said serpentine transportation path.

4. The conveyor system of claim 3, wherein said first and said second main guide elements are separated by a select distance, wherein said main guide elements have substantially equivalent diameters, and wherein said vertical distance separating said inlet and outlet substantially corresponds to the sum of diameters of the first and second main cylindrical guide elements and the distance of separation between the first and second main guide elements.

5. The conveyor system of claim 4, wherein the first main guide element and second main guide element cooperate to maintain contact between the first and second endless conveying elements through at least part of said first and third lateral segments.

6. The conveyor system of claim 4, wherein the diameter of the main guide element is a roller sufficiently large relative to at least one of said objects and approximately half said select distance to minimize bending force on said at least one object to avoid damaging the object.

7. The conveyor system of claim 3, further comprising a drive mechanism for driving the first and second cylindrical guide elements.

8. The conveyor system of claim 7, wherein the drive mechanism is configured to drive the second cylindrical main guide element at approximately the same speed as the first endless conveying element.

9. The conveyor system of claim 1, wherein the first and second endless conveying elements are elastic and sterilizable and formed from a material selected from the group consisting of belts, webs and cables.

10. The method of using a conveyor system of claim 1 comprising the steps of conveying the at least one object between said inlet and said outlet.

11. A conveyor for food products, comprising:
   a) means for receiving at least one food product in a select orientation, said receiving means being located at a first select height;
   b) means for dispensing said at least one food product in said select orientation said dispensing means being located at a second select height that is different from said first select height;
   c) means for establishing a curvilinear transport path between said receiving means and said dispensing means;
   d) means for conveying said at least one food product maintaining said select orientation between said means for receiving and said means for dispensing; and
   e) means for securing said at least one food product at least in respect to said curvilinear transport path, said means for securing overlapping said means for conveying along the curvilinear transport path and being driven by said means for establishing a curvilinear transport path.

12. A conveyor system for conveying solid objects of limited structural strength generally having a substantially uniform size, from a first height to a second height comprising:
   a cylindrical roller of a select diameter generally corresponding to a whole number fraction of the difference between the first and the second heights, said roller defining a generally continuous and smooth arcuate annular surface having a select curvature;
   a first endless conveyor element disposed between an inlet and an outlet and traveling over a path including a generally semicircular portion of said annular surface where said first endless conveyor element is driven by said roller; and a second endless conveyor element dimensioned to overlie said first endless conveyor at least substantially along said generally semicircular portion, said second endless conveyor element being driven with said first endless conveyor, where said second conveyor positionally secures and positionally stablizes the at least a select one of said solid objects disposed between said first endless conveyor at said overlying second endless conveyor.

13. The conveyor system of claim 12 where the solid objects are food products, the cylindrical rollers are composed of sterilizable plastic and the conveyors are formed from a material selected from the group consisting of belts, webs, and cables.

14. The conveyor system of claim 13 where the food products are patties of ground meat and further including a second cylindrical roller disposed proximate to and above the cylinder roller where said first and second conveyor elements establish a serpentine pathway between said inlet and output.

15. The conveyor system of claim 12 where said at least one of said solid objects is inverted between said inlet and outlet.

* * * * *